United States Patent
Baes et al.

(10) Patent No.: US 9,949,434 B2
(45) Date of Patent: Apr. 24, 2018

(54) CROP RESIDUE SPREADER

(71) Applicant: CNH Industrial America LLC, New Holland, PA (US)

(72) Inventors: Frederik Baes, Reninge (BE); Yvan C. C. Vandergucht, Lo-Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/286,288

(22) Filed: Oct. 5, 2016

(65) Prior Publication Data
US 2017/0094903 A1    Apr. 6, 2017

(30) Foreign Application Priority Data

Oct. 5, 2015    (BE) .................................. 2015/5623

(51) Int. Cl.
| | |
|---|---|
| *A01F 12/48* | (2006.01) |
| *B07B 1/50* | (2006.01) |
| *B08B 5/00* | (2006.01) |
| *A01D 41/12* | (2006.01) |

(52) U.S. Cl.
CPC .......... *A01D 41/1243* (2013.01); *A01F 12/48* (2013.01)

(58) Field of Classification Search
CPC ... A01F 12/444; A01F 12/40; A01D 41/1243; Y10S 460/901
USPC .............................. 460/100, 111, 901; 241/47
See application file for complete search history.

(56) References Cited

U.S. PATENT DOCUMENTS

| | | | | |
|---|---|---|---|---|
| 2,611,487 A | * | 9/1952 | Stevenson | A01D 75/282 137/45 |
| 2,694,493 A | * | 11/1954 | Odegarden | A01D 75/282 209/261 |
| 4,412,549 A | | 11/1983 | Rowland-Hill | |
| 4,711,253 A | * | 12/1987 | Anderson | A01D 41/1243 460/100 |
| 4,917,652 A | | 4/1990 | Glaubitz et al. | |

(Continued)

FOREIGN PATENT DOCUMENTS

| | | |
|---|---|---|
| DE | 19750393 A1 | 4/1998 |
| EP | 0631717 A1 | 1/1995 |

(Continued)

OTHER PUBLICATIONS

EP16192192, Extended European Search Report, dated Feb. 13, 2017, 5 pages.

*Primary Examiner* — Arpad Fabian-Kovacs
(74) *Attorney, Agent, or Firm* — Peter K. Zacharias; Patrick M. Sheldrake

(57) ABSTRACT

A crop residue spreader including at least one impeller, at least one radial housing, and at least one blower outlet opening. The at least one radial housing includes a crop residue outlet opening. The at least one impeller is configured to be rotatably driven around a rotation axis such that a crop residue flow is ejected through the crop residue outlet opening of the at least one radial housing, such that the crop residue flow is converted from an incoming crop residue flow into a wider outgoing crop residue flow. The at least one separate blower outlet opening is separate from the crop residue outlet opening of the at least one radial housing. The at least one blower outlet opening is configured to provide an outgoing airflow to accelerate the crop residue flow.

14 Claims, 5 Drawing Sheets

(56) References Cited

U.S. PATENT DOCUMENTS

| | | | |
|---|---|---|---|
| 5,120,275 A * | 6/1992 | Zacharias | A01D 41/1243 460/111 |
| 6,113,491 A | 9/2000 | Holmen | |
| 6,354,938 B1 * | 3/2002 | Schrattenecker | A01F 12/40 241/47 |
| 6,500,064 B1 * | 12/2002 | Schrattenecker | A01D 41/1243 460/100 |
| 7,331,855 B2 | 2/2008 | Johnson et al. | |
| 7,896,732 B2 * | 3/2011 | Benes | A01D 41/1243 460/112 |
| 8,105,140 B2 * | 1/2012 | Teroerde | A01D 41/1243 460/112 |
| 8,210,915 B2 * | 7/2012 | Holmen | A01D 41/1243 460/111 |
| 8,475,248 B2 * | 7/2013 | Farley | A01D 41/1243 460/111 |
| 2003/0003974 A1 * | 1/2003 | Niermann | A01D 41/1243 460/111 |
| 2007/0256403 A1 * | 11/2007 | Teroerde | A01D 41/1243 460/100 |
| 2009/0113867 A1 * | 5/2009 | Birrell | A01F 12/444 56/13.3 |
| 2016/0374270 A1 * | 12/2016 | Maes | A01D 41/12 460/111 |

FOREIGN PATENT DOCUMENTS

| | | | |
|---|---|---|---|
| WO | 9313643 A1 | 7/1993 | |
| WO | 9708937 A1 | 3/1997 | |

* cited by examiner

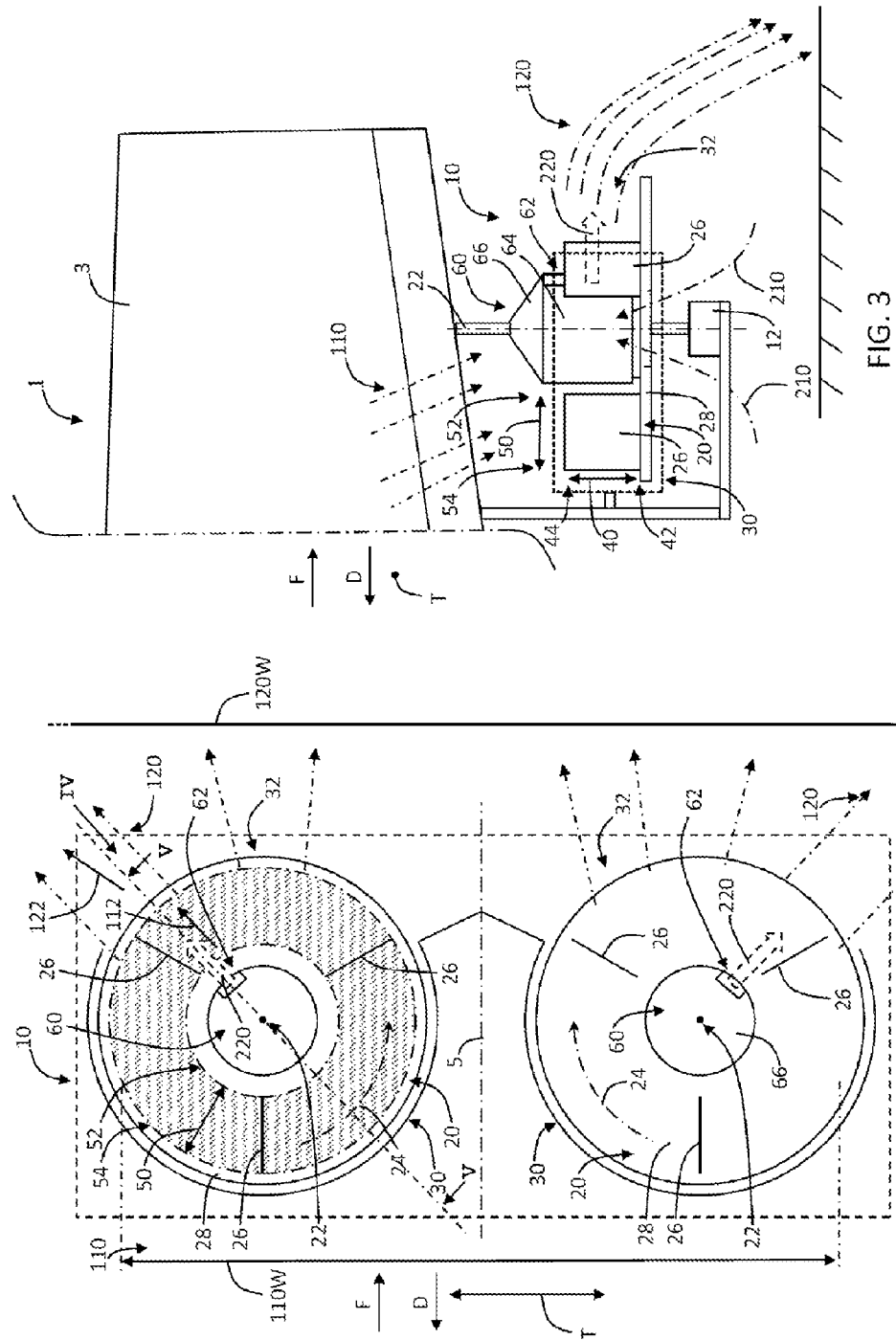

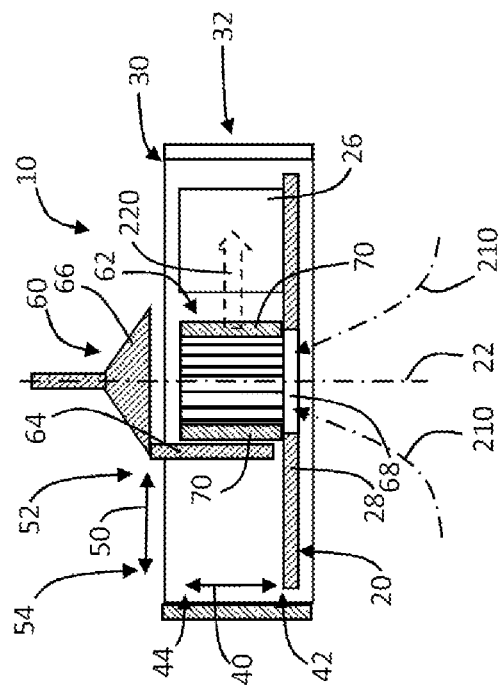
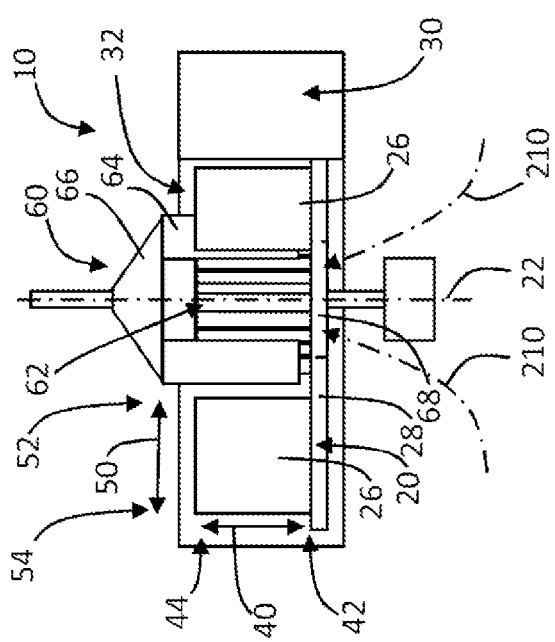

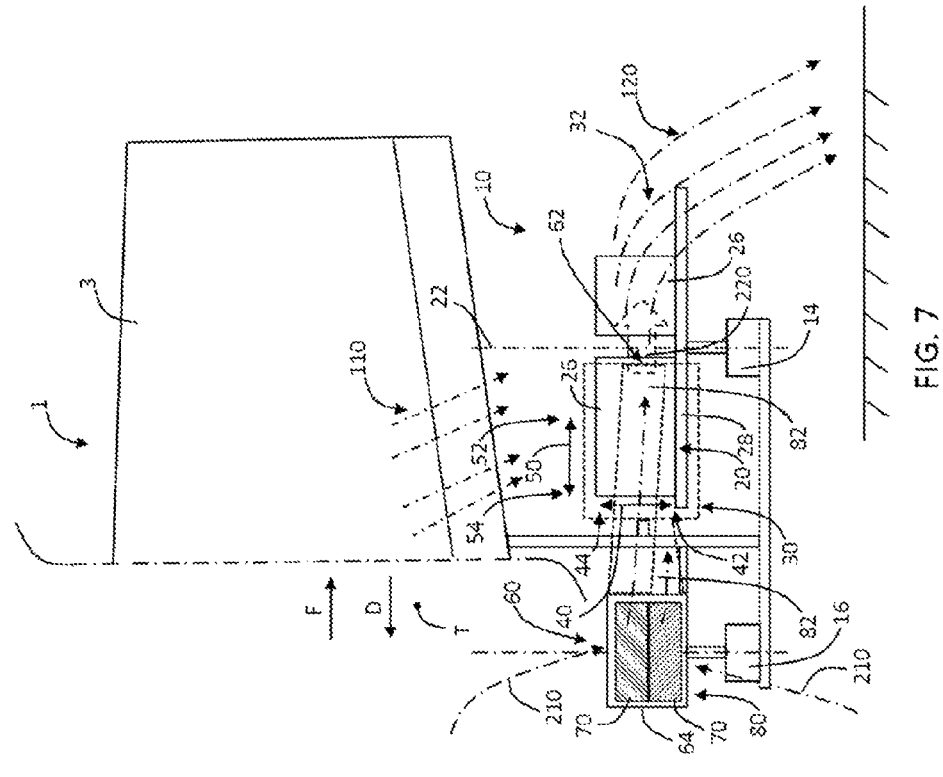
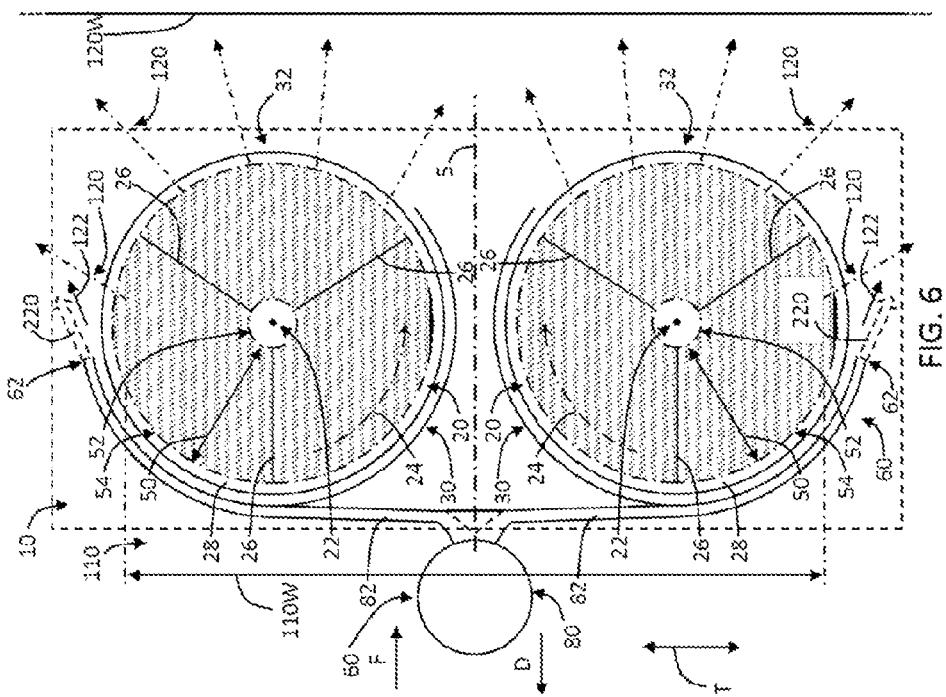

CROP RESIDUE SPREADER

CROSS REFERENCE TO RELATED APPLICATION

This application claims priority to Belgian Application No. 2015/5623 filed Oct. 5, 2015, the contents of which are incorporated herein by reference.

TECHNICAL FIELD

The present invention generally relates to a crop residue spreader, more particularly a crop residue spreader for a harvester, such as for example a combine harvester.

BACKGROUND

A crop residue spreader for a harvester, such as for example a combine harvester, is known from U.S. Pat. No. 7,331,855. This crop residue spreader makes use of rotating impellers in combination with an airflow. As shown in FIG. 6 of U.S. Pat. No. 7,331,855 the impeller has impeller blades projecting downwards from a rotating impeller disc. This rotating impeller disc forms an upper boundary surface of the rotating impeller which receives an incoming crop residue flow from below. Air fins are secured to the upper side of the rotating impeller disc of the impeller, this means at the opposite side of the rotating disc with respect to the impeller blades. When these air fins are rotated together with the rotating disc and the impeller blades, an airflow is generated is generated by these air fins. The rotating air fins create an airflow that is drawn in through holes in a cover above the rotating disc as shown most clearly in FIG. 5 of U.S. Pat. No. 7,331,855. The rotating air fins then force the airflow over the radial outer edges of the rotating disc. In this way the rotating air fins create an outgoing airflow in the area between the outer radial edge of the impeller disc and a corresponding radial housing that surround the outer radial edge of the impeller disc. This outgoing airflow reduces the risk that crop residue enters, via the cavity between the impeller disc and its radial housing, into the area above the impeller disc. In this way the risk of blockage resulting from clogging or plugging of crop residue in the area in between the upper side of the impeller disc and its corresponding housing is reduced. The problem with this particular type of airflow providing a cleaning function is that the outgoing airflow generally forms a sort of downwards, radial air curtain around the rotating impeller disc and thus also around the impeller blades. This downwards, radial air curtain disturbs the outgoing crop residue flow generated by the impellers. In this way this downwards, radial air curtain negatively affects the maximum width over which the crop residue flow can be spread by the rotating impeller blades. This is in particular the case for crop residue with a relatively small weight and/or small particle size such as for example chaff. The crop residue flow confining function of such an air curtain has for example been documented in EP2340703.

Further embodiments of crop residue spreaders are for example also known from U.S. Pat. No. 4,917,652, EP0631717 and DE19750393. These documents disclose a combine harvester with a crop residue spreader for spreading a grain-chaff mixture. This crop residue spreader also comprises oppositely rotatable impellers which each comprise an impeller disc to which impeller blades are mounted. The impellers of the crop residue spreader are also provided with a cup-shaped radial housing which partially surrounds the radial outer edges of the rotating impeller discs and comprises an outlet opening for ejecting an outgoing crop residue flow via an outlet nozzle. The incoming crop residue flow is generally received from above the impellers. The rotating impeller blades mounted on top of the impeller discs subsequently cooperate with the radial cup-shaped housing to propel the crop residue flow through the outlet nozzle.

According to some embodiments, such as for example FIGS. 1-3 of U.S. Pat. No. 4,917,652, FIGS. 1-4 of EP0631717 or the embodiments of DE19750393, an incoming suction airflow is generated by means of the impeller blades themselves in order to enable a more efficient intake of lighter crop residue components such as chaff into the crop residue spreader. However in order to generate such an incoming suction airflow by means of the impeller blades themselves, the impellers need to be provided with an inlet opening for the incoming crop residue flow which has a radius that is smaller than the radius of the rotating impellers. In this way the crop residue flow is not directly impacted by the most radially outward part of the impeller blades, which has the highest absolute velocity, thereby limiting the maximum distance over which the crop residue can be spread. Additionally a part of the generated airflow escapes, downwards, in between the impeller disc and the cup-shaped radial housing. This reduces the part of the generated airflow that is propelled through the outlet opening to the outlet nozzle, thereby also limiting the maximum distance over which the crop residue can be spread. Additionally this also requires the crop residue flow to be constricted to this reduced inlet opening towards the impeller blades, thereby increasing the risk of spillage or leading to converging funnel like elements that disturb the incoming crop residue flow and increase the risk of blockage. Still further the incoming crop residue flow and the incoming suction airflow are received through the same inlet opening. It is clear that uncontrolled variations in the incoming crop residue flow will inevitably also cause uncontrolled variations in the incoming suction airflow. The same holds for the uncontrolled variations in the crop residue flow in the area of the impeller blades which will inevitably cause uncontrolled variations in the generated airflow as the impeller blades are used as airflow generating elements. Such uncontrolled variations in the generated airflow, will clearly also result in uncontrolled variations in the maximum distance over which the crop residue can be spread. Additionally when the impeller blades are functioning both as an element for propelling the crop residue flow and as an element for generating an airflow, its arrangement and/or shape cannot be optimized for both functions. For example the optimal number of these elements, their optimal angle with respect to the radial direction, their optimal shape, etc. differs considerably for both respective functions. In this way the impeller cannot be designed to both generate an optimal airflow and optimally propel the crop residue, which limits the maximum distance over which the crop residue flow can be spread.

According to some alternative embodiments, such as for example FIGS. 2, 5 and 6 of U.S. Pat. No. 4,917,652; FIGS. 5, 7 and 8 of EP0631717, the impeller comprises impeller blades projecting from a first axial side of the impeller disc. For the referenced embodiments above this means that the impeller blades project upwards from the impeller disc, and thus project from the axial side of the impeller disc that faces the incoming crop residue flow. Further the impeller also comprises air vanes projecting from a second axial side of the impeller disc. For the referenced embodiments above this means that the air vanes project downwards from the impeller disc, and thus project from the axial side of the impeller disc that faces away from the incoming crop residue flow. When the impeller disc is rotatably driven the air vanes cooperate with an air inlet opening in the cup-shaped radial housing. This air inlet opening is provided in the cup-shaped radial housing at a side facing the air vanes. For the embodiments referenced above this thus means that the air inlet opening is provided below impeller disc in the bottom of the cup-shaped radial housing. The air vanes, when rotated, in this way create an incoming suction airflow through this air inlet opening. The air vanes propel this airflow through a radial outlet opening in the radial housing into an outlet nozzle. At the same time, at the other axial side of the impeller disc, the rotatably driven impeller blades receive the incoming crop residue flow through a crop residue inlet opening in the cup shaped radial housing. This crop residue inlet opening is provided at the side facing the impeller blades. This means, for the embodiments referenced above, that the crop residue inlet opening is provided above the impeller disc at the top of the cup-shaped radial housing. The crop residue received though the crop residue inlet opening is impacted by the rotatably driven impeller blades and propelled through the radial outlet opening in the radial housing into the outlet nozzle. In the outlet nozzle the outgoing crop residue flow is assisted by the outgoing airflow generated by the air vanes in order to increase the maximum distance over which the outgoing crop residue flow can be spread. This allows for embodiments in which the setup of the impeller blades and the air vanes can be differentiated in order to optimize both respective functions, for example by differentiating their number, their angle with respect to the radial direction, their shape, etc. However, also these embodiments present some particular disadvantages.

There is the risk that at least a part of the incoming suction airflow escapes axially in between the radial edge impeller and the radial housing in the direction of the incoming crop residue flow. This reduces the part of the generated airflow that is propelled through the outlet opening to the outlet nozzle, thereby also limiting the maximum distance over which the crop residue can be spread. Additionally, similar as explained above, this escaping airflow creates an upwards air curtain that disturbs the incoming crop residue flow leading to the risk of spillage at the crop residue inlet opening, even when the crop residue inlet opening has a radius that is larger than the radius of the rotating impellers. It is further also clear that the height of the outlet opening to the outlet nozzle, this means the distance of the outlet opening along the axial direction of the rotation axis of the impeller needs to be divided respectively between the height of the impeller blades and the height of the air vanes. It is thus clear that for a given height of the outlet opening the height of the impeller blades must be reduced with the height of the air vanes, and vice versa. This means that for a given height of the outlet opening the area of the impeller blades with which the crop residue flow is impacted will be reduced, in function of the area claimed by the air vanes for generating a suitable airflow, and vice versa. This leads to a design compromise in which both the acceleration of the crop residue flow by the impeller blades, as well as the volume and flow rate of the airflow generated by the air vanes are suboptimal, thus limiting the maximum distance over which the crop residue flow can be spread. Additionally the crop residue flow and the airflow are provided to the outlet opening in a layered way, as they are generated at different axial sides of the impeller disc. When reaching the outlet opening the crop residue flow generated by the impeller blades is thus still separated by the impeller disc from the airflow generated by the air vanes along the axial direction. This thus means that, before the generated airflow can interact with the crop residue flow, the airflow and/or the crop residue flow must first expand in the outlet nozzle along the axial direction of the impeller. It is clear that such an expansion reduces the flow rate of both the airflow and the crop residue flow and causes turbulences which still further reduce the flow rate. Additionally, it is clear that, it is necessary to provide sufficiently long and confined outlet nozzles in order to ensure sufficient mixing of the expanding airflow and the crop residue flow. Such ejection nozzles form a constriction which increases the risk of clogging or blockage. Additionally such ejection nozzles constrict the width of the outgoing crop residue flow to a rather narrow beam. This often leads to the need to provide for an oscillating movement of at least the radial position of the downstream end of these ejection nozzles in order to more uniformly distribute the crop residue flow across a wider area behind the harvester, thereby leading to a complex construction which is complex to control in function of varying harvesting or operating conditions.

Therefor there still exists a need for an improved crop residue spreader that is able to robustly and efficiently cope with further increases with respect to the desired maximum spreading width of the outgoing crop residue flow. Such a need is for example relevant for crop residue spreaders of a harvester, such as for example a combine harvester, in which there is made use of headers with an increasing width in the context of increasing harvesting capacities. This leads to an increasing difficulty to spread the crop residue flow in an efficient and robust way up till the desired maximum width. This desired maximum width for example being determined by width of the header of the combine harvester.

SUMMARY

According to a first aspect of the invention there is provided a crop residue spreader comprising: at least one impeller; and at least one corresponding radial housing comprising a corresponding crop residue outlet opening, the at least one impeller respectively configured to be rotatably driven around a corresponding rotation axis such that a crop residue flow is ejected through the corresponding crop residue outlet opening of the corresponding radial housing, and such that the crop residue flow is converted from an incoming crop residue flow into a wider outgoing crop residue flow, Characterised in that the crop residue spreader further comprises at least one corresponding separate blower outlet opening, separate from the corresponding crop residue outlet opening of the corresponding radial housing and configured to provide a corresponding outgoing airflow to accelerate the crop residue flow at least partly.

In this way the crop residue spreader is able to more efficiently perform its spreading function as the acceleration of the crop residue flow by the impeller, as well as the volume and flow rate of the airflow generated by the blower can be optimized without the need for a suboptimal compromise. Additionally the crop residue spreader is able to perform its spreading function in a more efficient and robust way, as the blower outlet opening is separate from the crop residue outlet opening. This ensures that the generated airflow can be provided in a more controlled and consistent way. Additionally the generated airflow can be provided at an optimal location relative to the crop residue outlet opening such that the impact of the airflow on the crop residue flow can be optimized. It is thus clear that in such a way the width of the outgoing crop residue flow can be increased in an efficient, robust and simple way, as the more optimal location of a separate blower outlet opening with respect to the crop residue flow also reduces or eliminates the need to provide sufficiently long outlet nozzles at the crop residue outlet opening.

According to an embodiment there is provided a crop residue spreader, characterised in that, the outgoing airflow out of the corresponding separate blower outlet opening is configured to further accelerate:

the incoming crop residue flow at least partly in a direction towards the corresponding crop residue outlet opening; and/or the outgoing crop residue flow at least partly in a direction away from the corresponding crop residue outlet opening.

In this way the airflow further accelerates the crop residue flow so that a higher maximum width of the outgoing crop residue flow can be reached, with a reduced risk that the airflow will affect the flow of the incoming crop residue flow in a negative way.

According to a further embodiment there is provided a crop residue spreader, characterised in that:

the at least one impeller respectively comprises two or more impeller blades configured to impact the incoming crop residue flow in a respective axial crop residue impact zone when rotatably driven around the corresponding rotation axis, the axial crop residue impact zone extending along the direction of the corresponding rotation axis between a first axial impact zone limit and an opposing second axial impact zone limit; and the at least one corresponding separate blower outlet opening respectively extending, along the direction of the corresponding rotation axis, at least partly in the respective axial crop residue impact zone.

In this way the outgoing airflow from the blower outlet opening impacts the crop residue flow in an efficient and effective way thereby allowing an increased maximum width for the outgoing crop residue flow.

According to a further embodiment there is provided a crop residue spreader, characterised in that said corresponding blower outlet extends in the respective axial crop residue impact zone over more 50% or more, preferably 80% or more, of the distance between the first impact zone limit and the opposing second impact zone limit.

In this way it is ensured that the outgoing airflow from the blower outlets impacts the crop residue flow efficiently and effectively over a substantial part of the crop residue flow without the need for additional elements such as for example outlet nozzles to allow intermixing of the outgoing airflow and the crop residue flow along the axial direction.

According to a further embodiment there is provided a crop residue spreader, characterised in that:

the two or more impeller blades of the respective impeller are further configured to impact the incoming crop residue flow in a respective radial crop residue impact zone when rotatably driven around the corresponding rotation axis, the radial crop residue impact zone extending radially with respect to the corresponding rotation axis between an impact zone minimum radius and an impact zone maximum radius; and the respective corresponding separate blower outlet opening is arranged, radially with respect to the corresponding rotation axis, out of the radial crop residue impact zone.

In this way an optimal arrangement of the blower outlet opening with respect to the crop residue flow is achieved, as the outgoing airflow is provided to the blower outlet opening without being influenced by the crop residue flow and additionally the outgoing airflow can be provided such that it impacts the crop residue flow optimally.

According to a further embodiment there is provided a crop residue spreader, characterised in that:

the first and second axial impact zone limits of the axial crop residue impact zone, respectively correspond to the level of the outer edges of the impeller blades along the direction of the rotation axis; and the impact zone minimum radius and the impact zone maximum radius, respectively correspond to the minimum radial distance between the rotation axis 22 and a proximate side of the impeller blades 26 and to the maximum radial distance between the rotation axis and a distal side of the impeller blades 26.

In this way a simple and efficient arrangement of the stationary blower outlet opening with respect to the rotating impeller blades is achieved, that allows an optimal impact of the outgoing airflow on the crop residue flow.

According to a further embodiment there is provided a crop residue spreader, characterised in that the respective corresponding separate blower outlet opening is arranged at a distance with respect to the corresponding rotation axis which is smaller than the impact zone minimum radius.

In this way the outgoing airflow can effect its accelerating function on both the crop residue flow present in the impact zone of the impeller blades, as well as on the outgoing crop residue flow through the crop residue outlet.

According to a further embodiment there is provided a crop residue spreader, characterised in that the crop residue spreader further comprises one or more separate blowers respectively coupled to one corresponding separate blower outlet opening, the corresponding separate blower comprising a radial blower housing and a plurality of blower vanes configured to be rotatably driven around a rotation axis aligned with the rotation axis of the corresponding impeller, the radial blower housing comprising the corresponding separate blower outlet opening.

In this way the blower can be realised by means of a compact construction that is integrated in the impellers.

According to a further embodiment there is provided a crop residue spreader, characterised in that the blower vanes are arranged on the impeller disc, the impeller disc comprising a blower inlet opening for an incoming airflow at a side distal from the incoming crop residue flow along the direction of the rotation axis.

In this way a simple and robust construction can be realised which can be combined with a simple drive system, however still allowing for an effective and efficient arrangement of the outgoing airflow with respect to the crop residue flow and sufficient flexibility for optimizing the blower vanes and the impeller blades separately for their separate functionality.

According to a further embodiment there is provided a crop residue spreader, characterised in that the crop residue spreader further comprises one or more separate blowers respectively coupled to one corresponding separate blower outlet opening, the at least one spreader and one or more corresponding blowers being rotatably driven by means of a common drive.

In this way a simple drive system is provided for. It is further clear that, even with a common drive for the spreaders and the blowers, embodiments are possible in which for example the rotational speeds can be different or varied separately, for example by means of a suitable variable transmission system, a selectable gear system, etc.

According to a further embodiment there is provided a crop residue spreader, characterised in that the respective corresponding separate blower outlet opening is arranged at a distance with respect to the corresponding rotation axis which is greater than the impact zone maximum radius.

In this way an embodiment is provided that allows easy modification or retrofitting to existing crop residue spreader designs as there is less a need to adapt the design of the impellers.

According to a further embodiment there is provided a crop residue spreader, characterised in that the crop residue spreader further comprises one or more separate blowers respectively coupled to one or more of the at least one corresponding separate blower outlet opening by means of a corresponding blower outlet channel configured to couple the corresponding separate blower opening to a source of the outgoing airflow.

This allows more flexibility with respect to the type and arrangement of the source of the outgoing airflow. The blower, by means of the blower outlet channels, could for example comprise or cooperate with a source of the outgoing airflow that is arranged more remotely, such as for example even a fan, compressor, compressed air source, etc. arranged on the harvester instead of at the crop residue spreader assembly itself.

According to a further embodiment there is provided a crop residue spreader, characterised in that said crop residue spreader comprises at least one pair of impellers configured to be counter-rotated such that said incoming crop residue flow is converted into said wider outgoing crop residue flow.

According to a further aspect of the invention there is provided a harvester comprising a crop residue spreader according to the first aspect of the invention, characterised in that said crop residue spreader is configured to receive the incoming crop residue flow from at least one upstream crop processing element of the harvester.

According to a further aspect of the invention there is provided a method of operating a crop residue spreader according to the first aspect of the invention, characterised in that the method comprises the step of a control system, in function of operator or sensor input signals, generating output signals to control:
said at least one rotatably driven impeller; and
said corresponding outgoing airflow respectively provided from said at least one corresponding separate blower outlet opening.

BRIEF DESCRIPTION OF THE DRAWINGS

FIG. 2 schematically illustrates the top view of the embodiment of the crop residue spreader of FIG. 1 in more detail;

FIG. 3 schematically illustrates a side view of the embodiment of the crop residue spreader of FIG. 1;

FIG. 4 schematically illustrates a view according to arrow IV in FIG. 3;

FIG. 5 schematically illustrates a cross section along the line V-V in FIG. 3

FIGS. 6 and 7 respectively schematically illustrate similar view as FIGS. 2 and 3 of an alternative embodiment of the crop residue spreader;

DETAILED DESCRIPTION OF EMBODIMENT(S)

Figure 1:
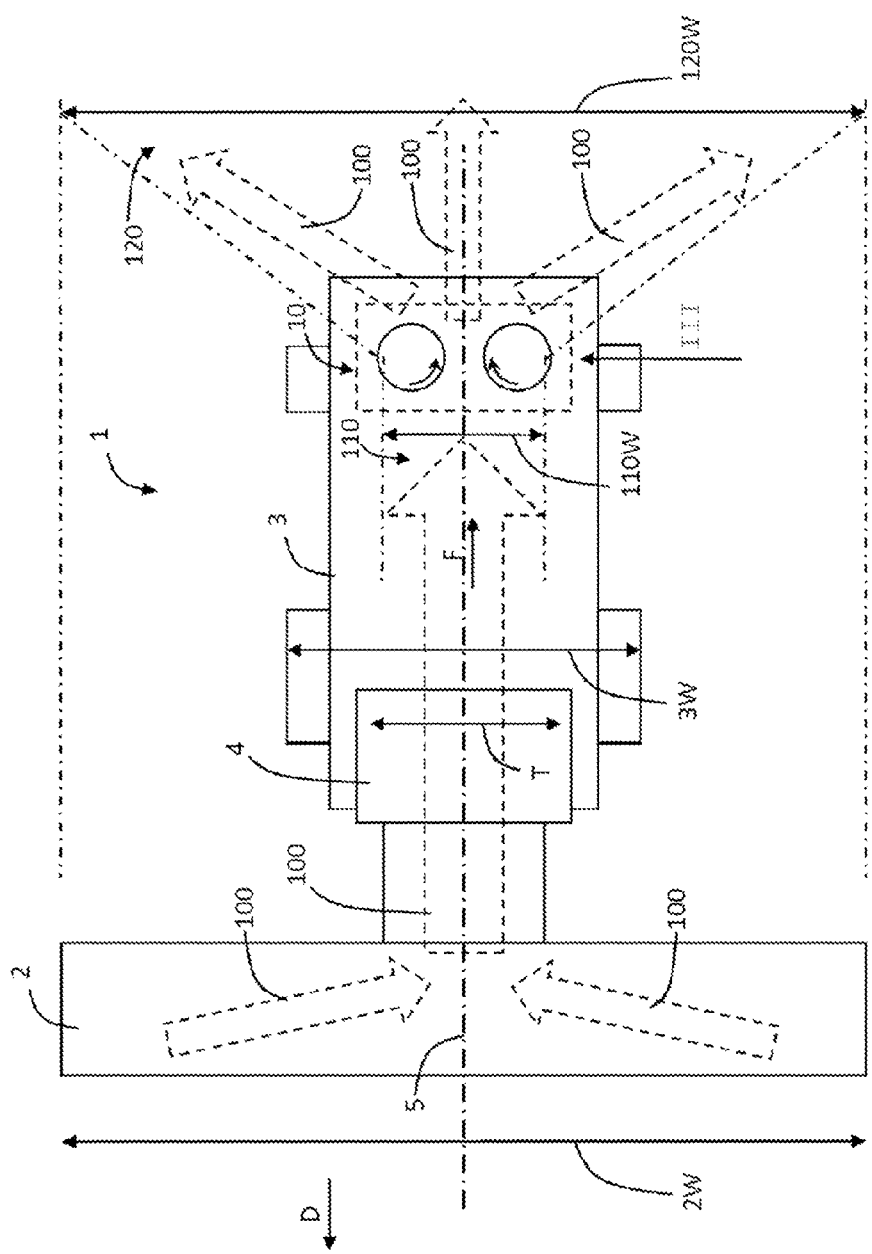
FIG. 1 schematically illustrates a top view of an embodiment of a harvester comprising an embodiment of a crop residue spreader.

FIG. 1 schematically shows a top view of a harvester 1, such as for example a combine harvester or any other suitable harvester 1, during a harvesting operation. During such a harvesting operation the harvester 1 generally travels along a driving direction D along a field on which the harvesting operation takes place. According to the embodiment shown, the combine harvester 1 comprises a header 2, which removes the crop from the field and conveys it to further downstream crop processing elements of the combine harvester vehicle 3. Such further downstream crop processing elements are for example a feeder, thresher, cleaning assembly, etc. According to a generally known exemplary embodiment, the header 2 is detachably arranged to the combine harvester vehicle 3, so that it can be removed for facilitating transport operations. The combine harvester vehicle 3 is for example controlled and operated by an operator from an operator cabin 4. Generally, it is clear that, when there is referred to the length or longitudinal direction of a combine harvester 1, this is to be interpreted as a general reference to the dimension of the harvester or its main elements along the driving direction D, such as for example also shown in FIG. 1. In this way, the combine harvester 1, as shown, comprises a longitudinal central axis 5. As shown, this longitudinal central axis 5 generally extends along the longitudinal direction of the harvester 1, generally along the middle of the harvester 1 as shown in the top view of FIG. 1. As further shown, in general, the width or transversal direction T of the harvester 1 or its main components extends transverse to the driving direction D and the longitudinal central axis 5 of the harvester 1.

It is further also clear that, as for the embodiment of the harvester 1 shown, the header 2 is often wider than the combine harvester vehicle 3. The width 3W of the combine harvester vehicle 3 is limited by the allowable maximum width for allowing road transport. As shown in the top view of FIG. 1, the width 3W of the combine harvester vehicle 3 is determined by the maximum dimension of the combine harvester vehicle 3 generally along the transverse direction T. The width 2W of the detachable header 2 is often higher than the width 3W of the combine harvester vehicle 3 in order to be able to take in a high amount of crop during a single pass when the harvester 1 is travelling along the field. As for example shown in FIG. 1, the width 2W of the header 2 generally refers to the maximum dimension of the header 2 along the transverse direction T, when the header 2 is attached to the combine harvester vehicle 3. It is thus clear that when the combine harvester vehicle 3 is driven along the field during a harvesting operation, a header 2 with a higher width 2W will enable to cover a larger surface area during a single pass of the combine harvester vehicle 3 along the field. The crop taken from the field by the header 2 provides for a crop flow 100 that is conveyed to the further downstream crop processing elements located in the combine harvester vehicle 3. It is clear that, as shown in FIG. 1, the part of this crop flow 100 that passes through these crop processing elements of the combine harvester vehicle 3 does not exceed the width of the harvester vehicle 3. After processing by these crop processing elements, the desired part of the crop flow 100, such as for example threshed and cleaned grain, corn, rice, etc. is for example temporary collected in a storage bin of the combine harvester 1 or conveyed to a suitable cart for further transport. Another part of the crop flow 100, generally referred to as a crop residue flow 100, is not collected, but, as shown, expelled from the combine harvester 1. Such crop residue flow 100 could for example comprise straw, stalks, leaves, etc. from which the useful parts of the crop have been removed during a threshing operation; or chaff or other light weight impurities that have been removed during a cleaning operation. Such crop residue flow 100 could for example be deposited on the field for further handling by subsequent harvesting operations, such as for example straw deposited for a subsequent bale forming operation. Alternatively, as shown, at least a part of the crop residue flow 100 could be suitably expelled and/or spread along the field, such as for example chaff, chopped straw or stalks, etc. In order to be able to spread the crop residue evenly along the entire surface of the field, the combine harvester 1 further comprises a crop residue spreader 10. Preferably the crop residue spreader 10 spreads the crop residue flow 100 comprising this crop residue across the entire width 2W of the header 2, as will be explained in further detail below. It is clear that the width 2W of the detachable header 2, when attached to the combine harvester vehicle 3, can be chosen to be larger than the width 3W of the combine harvester vehicle 3, as, during a transport operation along a road, such a detachable header 2 can be transported along a direction transverse to the direction of travel during the harvesting operation.

As shown in the top view of FIG. 1, the embodiment of the crop residue spreader 10, which will be described in further detail below, comprises two counter-rotating impellers 20. As shown in the top view of FIG. 1, these two counter-rotating impellers 20 are respectively positioned at both sides with respect to the longitudinal central axis 5 of the harvester 1. In such an embodiment each of the counter-rotating impellers 20 generally processes the part of the crop residue in the crop residue flow 100 at the respective side of the longitudinal central axis 5 of the harvester 1. As further shown, and generally known to the man skilled in the art, the counter-rotating impellers are rotatably driven to convert an incoming crop residue flow 110 into a wider outgoing crop residue flow 120. This means that the crop residue spreader 10 receives a crop residue flow 100 comprising crop residue from the upstream crop processing elements arranged in the combine harvester vehicle 3. It is clear that this incoming crop residue flow 110 received by the crop residue spreader 10 generally has a width 110W which does not exceed the width 3W of the combine harvester vehicle 3W, as it is received from upstream crop processing elements that are arranged in the combine harvester vehicle 3. The crop residue spreader 10 subsequently converts this incoming crop residue flow 110 and converts it into the wider outgoing crop residue flow 120 that is ejected onto the field. As shown, the width 120W of the outgoing crop residue flow 120 could for example correspond to the width 2W of the header 2. It is clear that alternative embodiments are also possible in which the outgoing crop residue flow 120 is spread along at least a part of the width 2W of the header. As known to the skilled person, according to the embodiment shown, the counter-rotating impellers 20 of the crop residue spreader 10 generally each act on their share of the incoming crop residue flow 110 to project it at least partly in a direction further away from the longitudinal central axis 5 of the harvester 1 when viewed along the top view, such as for example shown in FIG. 1.

FIG. 2 schematically shows a top view of an embodiment of the crop residue spreader 10 of the embodiment of the harvester 1 of FIG. 1 in more detail. As shown, the crop residue spreader 10 comprises a respective corresponding radial housing 30 for each impeller 20. As shown each of the counter-rotating impellers 20 cooperates with such a corresponding radial housing 30, which extends along at least a part of the outer radius of rotating impeller 20. As further shown the radial housing 30 comprises a corresponding crop residue outlet opening 32. Each impeller 20 of the crop residue spreader 10, as shown, during a crop residue spreading operation is rotatably driven around its corresponding rotation axis 22. As further shown, both impellers 20 are counter-rotating as they are rotated along opposing respective directions of rotation 24 when viewed according to the top view of FIG. 2. This rotational motion of the impellers 20 could be provided or derived from a suitable drive system 12, as schematically shown in FIG. 3. Such a suitable drive system 12 could for example comprise a suitable dedicated hydraulic, electric, mechanical drive or actuator, or a suitable clutch, coupling, etc. coupled to a drive system shared with other components of the harvester 1. Preferably, the drive system 12 allows the rotational speed of each of the respective impellers 20 to be varied for example in order to change the width 120W of the outgoing crop residue flow 120 or to take into account crop or harvesting parameters that influence the width 120W of the outgoing crop residue flow 120. Additionally, preferably the drive system 12 also allows to vary the rotational speed of the respective impellers 20 relative to each other, for example to take into account differences in the respective distance over which the crop is spread at both sides of the longitudinal central axis 5 of the harvester 1 caused by for example wind along a direction sideways to the driving direction of the harvester 1.

According to the embodiment of the crop residue spreader 10 shown in the top view of FIG. 2, the incoming crop residue flow 110 is received by crop residue spreader 10 the from upstream crop processing elements, such as for example a cleaning system, a chopper, etc., of the combine harvester vehicle 3. As shown in the top view of FIG. 1, the impellers 20 are preferably sized and positioned such that they generally cover at least the width 110W of the incoming crop residue flow 110. According to the embodiment shown, each of both counter-rotating impellers 20 generally handles a part of the incoming crop residue flow 110 at its respective side of the longitudinal central axis 5 of the harvester 1. As more clearly shown in the corresponding side view of FIG. 3, the incoming crop residue flow 110, according to this embodiment of the crop residue spreader 10, is received from an upwards direction towards the area in which the impellers 20 operate within their corresponding radial housing 30. It is clear that in the side view of FIG. 3, the radial housing 30 has been schematically illustrated in a transparent way, in order to more clearly show the different elements of the crop residue spreader inside it. According to the embodiment of FIGS. 1 to 3, the crop residue spreader 10 is arranged such that the impellers 20 rotate about an upwards central rotational axis 22, similar as for example known from EP0631717. It is clear that according to alternative embodiments alternative arrangements are possible in which the central rotational axis 22 of the impellers 20 is arranged in any suitable way, for example inclined at any suitable angle with respect to the ground plane, such as for example similar as known from DE19750393, U.S. Pat. No. 4,917,652, or even parallel to the ground plane, such as for example similar as known from EP2689655 or US2009156277. Additionally, according to still further embodiments, instead of receiving the incoming crop residue flow 110 from above, as shown in FIG. 3, according to alternative embodiments, the crop residue flow could for example be received from below, or from any suitable direction with respect to the specific arrangement of the impellers 20 and their corresponding radial housing 30, as long as in general there is a component in the direction of the incoming crop residue flow 110 along the direction of the rotational axis 22 of the impellers 20, such that the incoming crop residue flow 110 is able to reach the area inside the radial housing 30 in which the impellers 20 operate.

As generally known to the man skilled in the art, the counter-rotating impellers 20 cooperate with their corresponding radial housing 30 in such a way that after receiving the incoming crop residue flow 110, this crop residue flow is ejected through the crop residue outlet opening 32 of the radial housing 30. According to the embodiment shown in FIGS. 1-3, the corresponding radial housing 30 comprises a radial side wall 34 that extends at least along a section of the outer radius of the rotatable impeller 20, and that extends axially, with respect to the rotational axis 22, in the zone in which the rotatable impeller 20 operates. As further shown, this embodiment of the radial housing 30 also comprises a crop residue outlet opening 32, which is formed by a further section along the outer radius of the rotatable impeller 20 in which the radial side wall 34 is not present or comprises an opening. As the counter-rotating impellers 20 eject the crop residue flow 100 through the crop residue outlet opening 32 of their corresponding radial housing, as shown, the incoming crop residue flow 110 is converted into a wider outgoing crop residue flow 120. It is clear that a suitable arrangement and size of the crop residue outlet opening allows for the crop residue to be impacted and accelerated in a direction away from the rotational axis 22 of the impeller 20 in such a way that at least a part of the outgoing crop residue flow 120 is projected in a direction such that the distance with respect to the longitudinal central axis 5 of the harvester 1 is increased, thereby leading to an increase in the width 120W of the outgoing crop residue flow 120 with respect to the width 110W of the incoming crop residue flow 110.

According to the embodiment shown in FIGS. 1-3, each of the counter-rotating impellers 20 of the crop residue spreader comprises three impeller blades 26. However it is clear that according to alternative embodiments any other suitable number of impeller blades 26 are possible, such as for example two, four, five, six, or more. According to the embodiment shown, these impeller blades 26 are mounted to and extend upwards from an impeller disc 28. As shown, according to this embodiment, the impeller blades 26 are generally uniformly distributed along the circumference of the impeller disc 28 and thus also around the central rotational axis 22 of the impeller 20. In order to impart a suitable rotary motion to the impeller blades 26 around the rotational axis 22, the impeller disc 28 is rotatably mounted to a frame of the crop residue spreader 10 and is coupled to a suitable impeller drive system 12. The arrangement and shape of the impeller blades 26 can also vary considerably with respect to the schematically represented embodiment as shown in FIGS. 1-3, as long as in general the two or more impeller blades 26 are suitably arranged and shaped, such that, when the impeller blades 26 of the impeller 20 are rotated around the rotation axis 22, the impeller blades 26 impact the incoming crop residue flow 110 in an axial crop residue impact zone 40. As shown in FIG. 3, this axial crop residue impact zone 40 extends along the direction of the corresponding rotation axis 22 of the impeller 20, between a first axial impact zone limit 42 and an opposing second axial impact zone limit 44. According to the embodiment shown in FIG. 3, the first axial impact zone limit 42 is at the level of the lower edge of the impeller blades 26, which corresponds to the axial position of the lower impeller disc 28 from which the impeller blades 26 project upwards. The opposing second axial impact zone limit 44 corresponds to the level, along the direction of the rotation axis 22, of the upper edge of the impeller blades 26. Generally the first and second axial impact zone limits 42, 44, thus respectively correspond to the level of the outer edges of the impeller blades 26 along the axial direction of the rotation axis 22. According to the embodiment shown, the first and second axial impact zone limits 42, 44 thus respectively correspond to the level of the lower and upper edges of the impeller blades with respect to the direction of the rotation axis 22. As further shown in FIGS. 2 and 3, the impeller blades 26, when rotatably driven around the rotation axis 22, impact the incoming crop residue flow in a radial crop residue impact zone 50. This radial crop residue impact zone 50, as shown, extends radially with respect to the corresponding rotation axis 22 between an impact zone minimum radius 52 and an impact zone maximum radius 54. As shown most clearly in FIG. 2, according to this embodiment the annular crop residue impact zone 50 comprises an annular, cylindrical shape of which the central axis is aligned with the rotation axis 22 of the impeller 20. As further shown, the impact zone minimum radius 52 corresponds to the minimum radial distance between the rotation axis 22 and the proximate side of the impeller blades 26. The impact zone maximum radius 54 corresponds to the maximum radial distance between the rotation axis 22 and the distal side of the impeller blades 26.

As further shown in FIGS. 2 and 3, this embodiment of the crop residue spreader 10 further also comprises two separate blowers 60. As shown, each of the two impellers 20 respectively comprises a corresponding blower 60. As will be described in further detail below, according to this embodiment the separate blower 60 is arranged radially inside the impact zone minimum radius 52 of the radial crop residue impact zone 50 of the corresponding impeller 20. Additionally, according to this embodiment, the separate blower 60 comprises a corresponding separate blower outlet opening 62 which is arranged radially inside the impact zone minimum radius 52 of the radial crop residue impact zone 50 of the corresponding impeller 20. It is thus clear that the corresponding separate blower outlet opening 62, which is arranged radially inside the impact zone minimum radius 52, is separate from the corresponding crop residue outlet opening 32 of the corresponding radial housing 30 of the corresponding impeller 20, which is arranged radially outside the impact zone maximum radius 54. As will be explained in further detail below, as shown, both separate blowers 60 respectively provide from their separate blower outlet opening 62 an outgoing airflow 220 to accelerate the crop residue flow 100 at least partly.

As most clearly shown in the top view of FIG. 2, the outgoing airflow 220 provided from the separate blower outlet opening 62 is directed towards the crop residue outlet opening 32. The outgoing airflow 220 in this way traverses the radial crop residue impact zone 50 from the blower outlet opening 62 inside the impact zone minimum radius 52 towards the crop residue outlet opening 32 outside the impact zone maximum radius 54. Such an outgoing airflow 220 acts on the crop residue flow 100 present in the radial crop residue impact zone 50 such that this crop residue flow 100, in addition to the acceleration provided by the impact of the impeller blades 26 of the impeller 20, is further accelerated in a direction 112 towards the crop residue outlet opening 32. Additionally as this outgoing airflow 220 proceeds through the crop residue outlet opening 32 it further also accelerates the outgoing crop residue flow 120 at least partly in a direction 122 away from the crop residue outlet opening 32. As clearly shown, such a further acceleration of the crop residue flow with respect to the respective crop residue outlet openings 32 of the radial housing 30 of both counter-rotatable impellers 20 of the crop residue spreader 10 will enable the width 120W of the outgoing crop residue flow 120 to be increased, as both the direction 112 of the further acceleration of the crop residue flow 100 present in the radial crop residue impact zone 50 and the direction 122 of the further acceleration of the outgoing crop residue flow 120 is directed away from the longitudinal central axis 5 of the harvester 1. It is further also clear that such an outgoing airflow 220 will not affect the incoming crop residue flow 110 in an undesired way, as the outgoing airflow 220 can for example not reach the incoming crop residue flow 110 upstream of the crop residue spreader 10. As shown most clearly in FIGS. 3-5, according to this embodiment, the blower 60 could take in an incoming airflow 210 through a suitable airflow inlet opening 68 in the impeller disc 28 arranged radially inside the impact zone minimum radius 52. Preferably the airflow inlet opening 68 is provided at a side distal from the incoming crop residue flow 110 along the direction of the rotation axis 22. In this way the risk that the incoming airflow 210 for the blower 60 will have an adverse effect on the incoming crop residue flow 110 and vice versa is reduced.

As further shown, according to this embodiment for each of two counter-rotating impellers 20 there is provided a corresponding blower 60. This blower 60 comprises a radial blower housing 64 in which a plurality of blower vanes 70 are rotated around the rotation axis 22. As shown, according to this embodiment, these plurality of blower vanes 70 extend upwards from the impeller disc 28. They are radially positioned between the airflow inlet opening 68 in the impeller disc 28 and the radial blower housing 64 in which the separate blower outlet opening 62 is provided. The radial blower housing 64 with the blower outlet opening 62, the blower vanes 70 and the airflow inlet opening 68 are generally arranged and dimensioned to cooperate and function as a centrifugal type fan, thereby providing a simple and efficient source 80 of the outgoing airflow 220. As further shown, at the axial side proximal to the incoming crop residue flow 110 the rotating blower vanes 70 are shielded from the incoming crop residue flow 110 by means of a cover 66. As shown, according to this embodiment the cover 66 extends axially upwards from the radial blower housing 64 and radially inwards, generally towards the rotation axis 22 and thereby comprises a generally conical shape. This conical shape of the cover 66 is beneficial as it provides for a guide surface for the incoming crop residue flow 110 which guides it towards the radial crop residue impact zone 50 in an efficient way. As further shown this cover 66 also enables the radial blower housing 64 to be stationary mounted, for example to the frame of the crop residue spreader 10 or the harvester vehicle 3. Mounting the rotatable blower vanes 70 on the impeller disc 28 for rotation together with the impeller blades 26 offers the advantage that both the rotatable impeller 20 and the corresponding blower 60 can be rotatably driven by a means of common drive 12. This drive 12 only needs to be operatively connected to the impeller disc 28 in order to rotate it around the rotation axis 22. However, it is clear that alternative embodiments are possible, for example in which the rotatable blower vanes 70 are rotatably mounted and/or driven separately from the impeller disc 28, which provides for the advantage of increased flexibility in setting and/or controlling the rotational speed of both the impeller blades 26 and the blower vanes 70.

It is further also clear that alternative embodiments are possible in which the central rotation axis 22 of the impeller 20 and that of the rotatable blower vanes 70 do not coincide, as long as there is provided a suitable outgoing airflow 220 from the separate blower outlet opening 62. In order to provide for a simple construction, which can be driven by means of a simple and efficient drive system, it is however preferred that the plurality of blower vanes 70 are rotatably driven around a rotation axis aligned with the rotation axis 22 of the impeller 20. This for example allows to couple both these rotatable elements by means of simple means such as for example gears, belts and pulleys, etc. to a common drive system. As already explained above with reference to the drive system for the rotatable impellers, whether there is provided a drive system in common with the drive system for the impellers or a separate drive system for the blower vanes 70, the rotational motion of the blower vanes 70 could be provided or derived from a suitable drive system such as a suitable dedicated hydraulic, electric, mechanical drive or actuator, or by means of a suitable clutch, coupling, etc. from a drive system shared with other components of the harvester 1. Preferably, when there is provided a respective blower 60 for each of the plurality of impellers 20, the drive system for the blower vanes 70 allows the rotational speed of each of the respective blowers 60 to be varied for example in order to change the width 120W of the outgoing crop residue flow 120 or to take into account crop or harvesting parameters that influence the width 120W of the outgoing crop residue flow 120. Additionally, as for example mentioned further below with respect to FIG. 9, preferably the drive system of the blower vanes 70 also allows to vary the rotational speed of both the blowers 60 relative to each other and/or the rotational speed of their corresponding impellers 20, for example to take into account differences in the respective distance over which the crop is spread at both sides of the longitudinal central axis 5 of the harvester 1 caused by for example wind along a direction sideways to the driving direction of the harvester 1 or to change the distribution of heavier versus lighter crop residue particles along the width 120W of the outgoing crop residue flow 120.

It is clear that, according to the embodiment shown the number, arrangement and shape of the blower vanes 70 can be chosen in an optimal way for providing the outgoing airflow 220 independently from the impeller blades 26. According to the embodiment shown, for example the number of blower vanes 70, which is for example twenty or more, is far higher than the number of impeller blades 26, or the blower vanes 70 could for example be provided with a suitably curved shape or be arranged at a suitable angle with respect to the radial and/or axial direction in order to provide the outgoing airflow 220 in a desired way, while the shape and arrangement of the impeller blades 26 could be chosen differently in order to provide a desired impact on the crop residue flow 100 in the radial and axial crop residue impact zone 40, 50.

It is further clear that alternative to the embodiment of the centrifugal fan type system shown in the embodiment of FIGS. 4 and 5, other alternative embodiments are possible for a source 80 of the outgoing airflow 220. There could for example be made use of another type of fan system, such as for example a cross flow type fan or an axial flow type fan, etc. as long as similar to the embodiment described above the respective corresponding separate blower outlet opening 62 is arranged at a distance with respect to the corresponding rotation axis 22 which is smaller than the impact zone minimum radius 52.

As shown most clearly in FIGS. 4 and 5, according to this embodiment, the respective separate blower outlet opening 62 extends, along the direction of the rotation axis 22, entirely in the axial crop residue impact zone 40. Such an axial arrangement of the blower outlet opening 62 allows the outgoing airflow 220 to act optimally on the crop residue flow 100 as the outgoing airflow 220 impacts the crop residue flow 100 axially in the same zone as where it is accelerated by the impeller blades 26. According to the embodiment shown, this means that the outgoing airflow 220 is provided from the separate blower outlet opening 62 axially at the same side of the impeller disc 28 as where the impeller blades 26 operate. In this way there is for example no longer a need to provide sufficiently long outlet nozzles to allow sufficient mixing of the outgoing airflow and the outgoing crop residue flow 120 along the axial direction. It is further clear that preferably the blower outlet opening 62 extends over a sufficiently large portion of the axial crop residue impact zone 40 in order for the outgoing airflow 220 to efficiently act on a desired portion of the crop residue flow 100. Preferably the blower outlet opening 62 extends over 50% or more, for example 80% or more, of the distance between the first impact zone limit 42 and the opposing second impact zone limit 44. Although according to the embodiment shown, the blower outlet opening 62 extends entirely in the axial crop residue impact zone 40, it is clear that alternative embodiments are possible in which the blower outlet opening 62 is not entirely contained within the axial crop residue impact zone 40, as long as in general the respective corresponding separate blower outlet opening 62 extends, along the direction of the rotation axis 22, at least partly in the corresponding axial crop residue impact zone 40.

A further alternative embodiment of the crop residue spreader is schematically shown in the top view of FIG. 6 and the corresponding side view of FIG. 7. Similar elements have been provided with similar references and function in a similar way as described for the embodiments mentioned above. Alternative to the embodiments mentioned above, as most clearly shown in the top view of FIG. 6, the respective corresponding separate blower outlet openings 62 of both counter-rotating impellers 20 are now arranged at a distance with respect to the corresponding rotation axis 22 which is greater than the impact zone maximum radius 54. In this way the outgoing airflow 220 provided from the separate blower outlet opening 62 acts on the outgoing crop residue flow 120 that has passed through the separate crop residue outlet opening 32. The outgoing airflow 220 in this way further accelerates the outgoing crop residue flow 120 at least partly in a direction 122 away from the crop residue outlet opening 32. As shown, the direction 122 of the further acceleration of the outgoing crop residue flow 120 is preferably directed away from the longitudinal central axis 5 of the harvester 1, and thereby enables the width 120W of the outgoing crop residue flow 120 to be increased similar as already explained above. Such an embodiment for example allows a design of the impeller blades 26 of which the impact zone minimum radius 52 can be decreased without limitations for arranging a suitable separate blower outlet opening 62 inside it. Additionally this arrangement also provides the advantage that it more easily allows an existing crop residue spreader design to be modified and/or retrofitted to an improved crop residue spreader according to the invention as no modifications are necessary to the impeller 20 and corresponding radial housing 30.

As further shown, according to this embodiment, there is only one separate blower 60. This separate blower 60 comprises two separate blower outlet openings 62, one for each of the pair of impellers 20. Similar as already mentioned with reference to the embodiments of FIGS. 1 to 5 above, the pair of impellers is positioned at different sides of the longitudinal central axis 5 of the harvester 1 when viewed according to the top view of FIG. 6. During operation, when the impellers 20 are counter-rotated, this will cause the incoming crop residue flow 110 to be converted into the wider outgoing crop residue flow 120. According to the embodiment shown, the single blower 60 comprises a single source 80 of the outgoing airflow 220. The single source 80 is located more remotely from both separate blower outlet openings 62, when compared to the embodiments of FIGS. 1 to 5. Therefor the blower 60 further comprises two blower outlet channels 82 that respectively couple the two blower outlet openings 62 to the source 80. The blower outlet channels 82 could for example be a suitable guide, duct, channel, tube, etc. for channelling the airflow provided by the source 80 towards the respective blower outlet openings 62. In this way, similar as described for the embodiments above, a desired outgoing airflow 220 is provided at both separate blower outlet openings 62. In the interest of clarity, in the side view of FIG. 7, the radial housing 30 and the blower outlet channels 82 have been schematically illustrated in a transparent way, in order to more clearly show the different elements of the crop residue spreader behind them. It is clear that alternative embodiments are possible, for example in which there are provided two sources 80, one for each blower outlet opening 62 and corresponding blower outlet channel 82. According to the embodiment shown, the source 80 of the outgoing airflow 220 could for example be a suitable centrifugal type fan. According to still a further embodiment it is also possible to arrange for example two sources 80 respectively in the direct vicinity of two corresponding respective blower outlet openings 62, such that no blower outlet channels 82 need to be provided. In such a case the blower outlet opening 62 could for example be embodied as a suitable opening in a radial blower housing 64 of a centrifugal fan type blower 60 acting as a source 80 of the outgoing airflow 220, similar as described above. According to the embodiment shown, the source 80 for example comprises rotatable fan elements 70 that can be rotatably driven around a rotation axis inside a radial blower housing 64 which is parallel to the rotation axis 22 of the impellers 20. However it is clear that according to alternative embodiments alternative arrangements of the rotation axis of the source are possible. As further shown, according to this particular embodiment, two sets of fan elements 70 are provided within a corresponding radial fan housing 64. Each of the sets of fan elements 70 is arranged in a different axial region of the radial fan housing 64 and comprises an optimized arrangement with respect to its angle, shape, number, etc. for providing an outgoing airflow 220 through both the respective corresponding blower outlet channels 82 in an optimized way. Additionally, according to the embodiment shown, there is provided a drive system 16 for the source 80 of the blower 60 and a separate drive system 14 for the impellers 20. As already explained above, such an arrangement increases flexibility in controlling the amount of the outgoing airflow 220 independently from the rotational speed of the impellers 20. However, it is clear that further alternative embodiments are possible in which for example a common drive system is used for the impellers 20 and/or the at least one blower 60. Additionally, it is clear that the more remote arrangement of the source 80 with respect to the crop residue flow 100 allows for more a flexibility for the arrangement of suitable inlets and a reduced need for shielding the particular areas of the source 80 against the crop residue flow. As shown, for example, a centrifugal type fan as source 80 can now for example comprise inlet openings at both axial sides for taking in an incoming airflow 210. It is further clear that according to alternative embodiments alternative sources 80 for the outgoing airflow 220 could be provided, such as for example other suitable fan types, or even a compressor or reservoir of compressed air. As the blower outlet channels 82 allow the source 80 or sources 80 for the outgoing airflow 220 of the respective blower outlet openings 62 to be arranged in a more remote way, this also creates the flexibility for embodiments which could make use of such sources arranged on the assembly of the crop residue spreader 10, or alternatively even in a more remote location such as for example on the harvester vehicle 3, which could already be provided with a suitable source 80 for generating an airflow, such as for example a compressor, a reservoir of compressed air and/or a suitable compressed air circuit and/or associated control elements, etc.

Although the blower outlet openings 62 are now positioned radially at a distance greater than the impact zone maximum radius 54, similar as in the embodiment of FIGS. 1 to 5, the blower outlet openings 62 are still preferable arranged entirely or at least partly along a sufficiently large part of the axial crop residue impact zone 40 in order to allow an optimal impact of the outgoing airflow 220 on the outgoing crop residue flow 120 ejected from the respective crop residue outlet openings 32.

Figure 8:
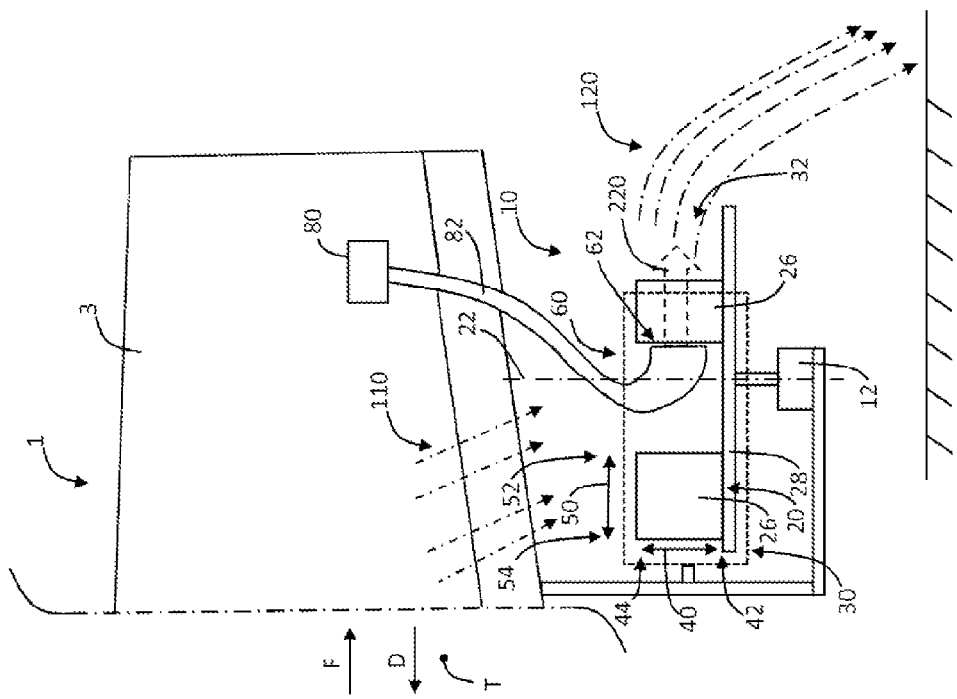
FIG. 8 schematically illustrates a similar view as FIG. 3 of still a further alternative embodiment of the crop residue spreader.

According to still a further alternative embodiment, the remote arrangement of the source 80 of the outgoing airflow 220 could also be combined with an embodiment in which the separate blower outlet openings 62 are arranged inside the impact zone minimum radius 52, similar as for example described with reference to FIGS. 1 to 5. As schematically shown in FIG. 8, according to such an embodiment, the blower outlet channels 82 could then be guided from a source 80 of the outgoing airflow 220 mounted on the harvester vehicle 3, through the area within the impact zone minimum radius 52 of the axial crop residue impact zone 40, towards the blower outlet opening 62. It should be clear that still further alternative embodiments are possible than those described above, as long as in general for each impeller 20, the respective corresponding separate blower outlet opening 62 is arranged, radially with respect to the corresponding rotation axis 22, out of the radial crop residue impact zone 50. This thus means at a distance with respect to the rotation axis 22 greater than the crop residue impact zone maximum radius 54 or smaller than the crop residue impact zone minimum radius 52.

Figure 9:
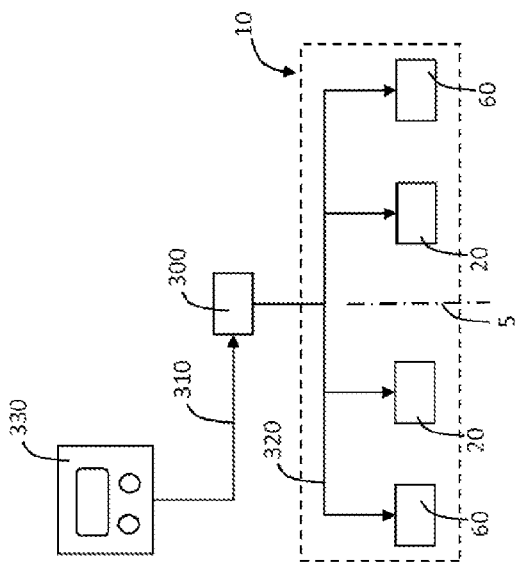
FIG. 9 schematically illustrates a suitable control system for an embodiment of the crop residue spreader.

As further shown in FIG. 9, the crop residue spreader 10 could be coupled to a suitable control system 300. This control system 300 could for example receive input signals 310 from an operator or suitable sensors for inputting crop or harvesting parameters, such as for example the desired width 120W of the outgoing crop residue flow 120, side wind level and direction, the type of harvested crop, the amount and composition of the crop residue flow 100, etc. According to the embodiment shown, the input signals 310 could for example be generated by means of a console 330 provided with suitable input means for an operator to input crop or harvesting parameters and/or coupled to one or more sensors for determining such parameters. The control system 300, in function of the received input signals 310 is then configured to generate output signals 320 to control the operation of the impellers 20 and the blowers 60 of the crop residue spreader 10. These output signals 320 could for example control the rotational speed of the drives 12, 14, 16 of the respective impellers 20 and/or the respective blowers 60, or control other control elements that influence the outgoing airflow 220, such as for example its pressure or flow rate, or the operation of the impellers 20, such as for example the position of the radial housing 30. Even with a common drive 12 for the spreaders 20 and the blowers 60, embodiments are possible in which for example their rotational speeds can be controlled separately by the control system 300, for example by controlling a variable transmission system, a selectable gear system, etc. In this way the control system 300 is able to flexibly and efficiently control the desired width 120W of the outgoing crop residue flow 120. The control system 300, by varying the effect of the outgoing airflow 220 relative to the effect of the impellers 20, preferably also enables to control the distribution of different fractions, such as for example lighter and heavier fractions of the outgoing crop residue flow 120, along the width 120W. Still further it will also be possible to more efficiently maintain the desired distribution of the outgoing crop residue flow 120 with respect to the longitudinal central axis 5 of the harvester 1. It is clear that still further control scenarios are possible, as long as in general the control system 300, in function of operator or sensor input signals 310, generates output signals 320 to control at least one rotatably driven impeller 20 and the outgoing airflow 220 provided from each blower outlet opening 62 by said at least one separate blower 60.

Although according to the embodiments described above the crop residue spreader comprises a pair of counter rotating impellers 20, it is clear that alternative embodiments are possible with a different plurality of impellers 20. Even an embodiment with a single impeller 20 could be possible. As long as in general the crop residue spreader 10 comprises at least one impeller 20 and at least one corresponding radial housing 30. This corresponding radial housing 30 of the corresponding impeller 20 comprising a corresponding crop residue outlet opening 32. Similar as explained in detail above, the at least one impeller 20 is then respectively rotatably driven around a corresponding rotation axis 22 such that the crop residue flow 100 is ejected through the corresponding crop residue outlet opening 32 of the corresponding radial housing 30. The at least one impeller 20 and its corresponding radial housing 30 in this way respectively cooperate such that the crop residue flow 100 is converted from an incoming crop residue flow 110 into a wider outgoing crop residue flow 120. In general the crop residue spreader 10 then further comprises at least one corresponding separate blower outlet opening 62, separate from the corresponding crop residue outlet opening 32 of the corresponding radial housing 30. This at least one corresponding separate blower outlet opening 62, similar as described in detail above, provides a corresponding outgoing airflow 220 to accelerate the crop residue flow 100 at least partly. This means that, for example, similar as explained above, the outgoing airflow 220 out of the corresponding separate blower outlet opening 62 accelerates the incoming crop residue flow 110 at least partly in a direction 112 towards the corresponding crop residue outlet opening 32. This could also mean that, for example, similar as described above, the outgoing airflow 220 out of the corresponding separate blower outlet opening 62 accelerates the outgoing crop residue flow 120 at least partly in a direction 122 away from the corresponding crop residue outlet opening 32.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A crop residue spreader comprising:
   at least one impeller;
   at least one radial housing comprising a crop residue outlet opening, the at least one impeller positioned to be rotatably driven around a rotation axis such that a crop residue flow is ejected through the crop residue outlet opening of the at least one radial housing, and such that the crop residue flow is converted from an incoming crop residue flow into a wider outgoing crop residue flow;
   at least one separate blower outlet opening, separate from the crop residue outlet opening of the at least one radial housing, the at least one separate blower outlet opening positioned to provide an outgoing airflow to accelerate the crop residue flow; and
   wherein the at least one impeller comprises two or more impeller blades positioned to impact the incoming crop residue flow in an axial crop residue impact zone when rotatably driven around the rotation axis, the axial crop residue impact zone extending along a direction of the rotation axis between a first axial impact zone limit and an opposing second axial impact zone limit; and
   the at least one separate blower outlet opening extending, along the direction of the rotation axis, at least partly in the axial crop residue impact zone.

2. The crop residue spreader according to claim 1, wherein the outgoing airflow out of the at least one separate blower outlet opening is configured to accelerate:
   the incoming crop residue flow in a direction towards the crop residue outlet opening; or
   the outgoing crop residue flow in a direction away from the crop residue outlet opening.

3. The crop residue spreader according to claim 1, wherein the at least one separate blower outlet opening extends in the axial crop residue impact zone over 50% of a distance between the first impact zone limit and the opposing second impact zone limit.

4. The crop residue spreader according to claim 1, wherein:
   the two or more impeller blades of the impeller are further configured to impact the incoming crop residue flow in a radial crop residue impact zone when rotatably driven around the rotation axis, the radial crop residue impact zone extending radially with respect to the rotation axis between an impact zone minimum radius and an impact zone maximum radius; and
   the at least one separate blower outlet opening is arranged, radially with respect to the rotation axis, out of the radial crop residue impact zone.

5. The crop residue spreader according to claim 4, wherein:
   the first and second axial impact zone limits of the axial crop residue impact zone respectively correspond to a level of outer edges of the impeller blades along the direction of the rotation axis; and
   the impact zone minimum radius and the impact zone maximum radius, respectively correspond to a minimum radial distance between the rotation axis and a proximate side of the impeller blades and to a maximum radial distance between the rotation axis and a distal side of the impeller blades.

6. The crop residue spreader according to claim 4, wherein the at least one separate blower outlet opening is arranged at a distance with respect to the rotation axis which is smaller than the impact zone minimum radius.

7. The crop residue spreader according to claim 6, wherein the crop residue spreader further comprises one or more separate blowers coupled to a separate blower outlet opening, the one or more separate blowers comprising a radial blower housing and a plurality of blower vanes configured to be rotatably driven around a rotation axis aligned with the rotation axis of the at least one impeller, the radial blower housing comprising the at least one separate blower outlet opening.

8. The crop residue spreader according to claim 7, wherein the at least one impeller further comprises an impeller disc comprising an airflow inlet opening for an incoming airflow at a side distal from the incoming crop residue flow along the direction of the rotation axis, and wherein the blower vanes are arranged on the impeller disc.

9. The crop residue spreader according to claim 1, wherein the crop residue spreader further comprises one or more separate blowers coupled to the at least one separate blower outlet opening, the at least one impeller and the one or more separate blowers being rotatably driven by a common drive.

10. The crop residue spreader according to claim 4, wherein the at least one separate blower outlet opening is arranged at a distance with respect to the rotation axis which is greater than the impact zone maximum radius.

11. The crop residue spreader according to claim 1, wherein the crop residue spreader further comprises one or more separate blowers coupled to the at least one separate blower outlet opening by a blower outlet channel configured to couple the at least one separate blower opening to a source of the outgoing airflow.

12. The crop residue spreader according to claim 1, further comprising at least one pair of impellers configured to be counter-rotated such that the incoming crop residue flow is converted into the wider outgoing crop residue flow.

13. A harvester comprising the crop residue spreader according to claim 1, the harvester comprising at least one upstream crop processing element, wherein the crop residue spreader is configured to receive the incoming crop residue flow from the at least one upstream crop processing element of the harvester.

14. A crop residue spreader comprising:
at least one impeller;
at least one radial housing comprising a crop residue outlet opening, the at least one impeller positioned to be rotatably driven around a rotation axis such that a crop residue flow is ejected through the crop residue outlet opening of the at least one radial housing, and such that the crop residue flow is converted from an incoming crop residue flow into a wider outgoing crop residue flow;
at least one separate blower having an inlet outside the crop residue flow and an outlet opening, separate from the crop residue outlet opening of the at least one radial housing, the at least one separate blower outlet opening positioned to provide an outgoing airflow to accelerate the crop residue flow and wherein the outgoing airflow out of the at least one separate blower outlet opening is positioned to accelerate the incoming crop residue flow on a direction towards the crop residue outlet opening; or the outgoing crop residue flow in a direction away from the crop residue outlet opening.

\* \* \* \* \*